United States Patent [19]

Lat

[11] Patent Number: 5,655,969

[45] Date of Patent: Aug. 12, 1997

[54] METHOD OF MANUFACTURING A CORROSION-RESISTANT, HEADED FASTENER, SUCH AS NAIL FOR EXTERIOR APPLICATIONS, AND MANUFACTURING METHOD

[75] Inventor: Geronimo E. Lat, Prospect Heights, Ill.

[73] Assignee: Illinois Tool Works Inc., Glenview, Ill.

[21] Appl. No.: 564,673

[22] Filed: Nov. 29, 1995

Related U.S. Application Data

[62] Division of Ser. No. 388,717, Feb. 15, 1995.

[51] Int. Cl.$^6$ .................................................. B21K 1/46
[52] U.S. Cl. ........................... 470/5; 470/40; 411/902
[58] Field of Search .............................. 470/5, 7, 34, 38, 470/40, 51, 53, 121; 228/3.1, 18; 219/57; 411/371, 373, 376, 901, 902

[56] References Cited

U.S. PATENT DOCUMENTS

| | | | |
|---|---|---|---|
| 1,867,353 | 7/1932 | Diskson | 470/7 |
| 3,635,389 | 1/1972 | Shibata | 470/40 |
| 4,802,807 | 2/1989 | Offenburger et al. | 411/387 |
| 4,964,774 | 10/1990 | Lat et al. | 411/446 |
| 5,033,181 | 7/1991 | Lat et al. | 29/433 |

FOREIGN PATENT DOCUMENTS

| | | |
|---|---|---|
| 0672482 | 9/1995 | European Pat. Off. . |
| 2032775 | 11/1970 | France . |
| 698791 | 10/1940 | Germany . |

*Primary Examiner*—Lowell A. Larson
*Assistant Examiner*—Thomas C. Schoeffler
*Attorney, Agent, or Firm*—Schwartz & Weinrieb

[57] ABSTRACT

A corrosion-resistant, headed fastener, such as a nail for exterior applications, is made from a carbon steel wire pre-coated with a protective, metallic layer having corrosion-resistant properties, the protective, metallic layer being discontinuous at a region on a leading end of the pre-coated wire. After at least part of a protective, metallic cap having corrosion-resistant properties is disposed near the leading end of the pre-coated wire, at least part of the protective, metallic cap is welded to the leading end of the pre-coated wire so as to cover the region where the protective, metallic layer is discontinuous, by impact welding, as a fastener is formed from the pre-coated wire in such manner that the fastener is formed with a shank and with a head, which is formed by deformation of the leading end. The welded part of the protective, metallic cap provides the fastener with corrosion resistance at the region where the protective, metallic layer is discontinuous, and the protective, metallic layer provides the fastener with corrosion resistance elsewhere. The protective, metallic layer is made from chromium, nickel, zinc, aluminum, or an alloy comprising zinc and aluminum, preferably from zinc or such an alloy. The protective, metallic cap is made from chromium, nickel, zinc, aluminum, or an alloy comprising zinc and aluminum, preferably aluminum, which can be visually differentiated from zinc or such an alloy.

22 Claims, 1 Drawing Sheet

METHOD OF MANUFACTURING A CORROSION-RESISTANT, HEADED FASTENER, SUCH AS NAIL FOR EXTERIOR APPLICATIONS, AND MANUFACTURING METHOD

This application is a division of application Ser. No. 08/388,717, filed Feb. 15, 1995.

TECHNICAL FIELD OF THE INVENTION

This invention pertains to the manufacture of a fastener having a head and a shank, such as a siding, decking, fencing, or roofing nail, from a carbon steel wire pre-coated with a protective, metallic layer having corrosion-resistant properties, such as pre-galvanized, carbon steel wire. This invention employs a protective, metallic cap, which provides the fastener with corrosion resistance at an area where the protective, metallic layer is discontinuous on the head of the fastener.

BACKGROUND OF THE INVENTION

Commonly, siding, decking, fencing, or roofing nails and other fasteners intended for outdoor use or other exterior applications are made from carbon steel wire. It is necessary to protect such fasteners against corrosion.

It is conventional to galvanize such fasteners, in a batch process, after such fasteners have been formed. It is known, moreover, to coat the galvanized nails with a polymeric material, which provides further protection against corrosion.

As disclosed in Lat et al. U.S. Pat. No. 5,033,181, it is known to make such fasteners from carbon steel wire coated with a protective, metallic layer having corrosion-resistant properties, such as pre-galvanized, carbon steel wire or pre-chromated, carbon steel wire. As disclosed therein, the protective, metallic layer is discontinuous and the carbon steel of the wire is exposed at a region on a leading end of the wire, on which end a head of such a fastener is formed.

As disclosed in the Latet al. patent, the head of each fastener is coated with a protective, polymeric layer covering the region where the protective, metallic layer is discontinuous, so as to restore the corrosion-resistant properties of such fastener.

SUMMARY OF THE INVENTION

This invention provides an improved method for manufacturing a corrosion-resistant, headed fastener, such as a roofing nail, from a carbon steel wire pre-coated with a protective, metallic layer having corrosion-resistant properties. This invention employs a protective, metallic cap having corrosion-resistant properties, at least part of which cap is provided so as to provide the fastener with corrosion resistance at a region where the protective, metallic layer is discontinuous.

For purposes of this invention, carbon steel wire prechromated (for example, after having been pre-galvanized) is regarded as being pre-coated with a protective, metallic layer having corrosion-resistant properties. Moreover, sacrificial properties are regarded as corrosion-resistant properties.

Desirably, the protective, metallic layer and the protective, metallic cap respectively are made from chromium, nickel, zinc, aluminum, or an alloy comprising zinc and aluminum. Preferably, the protective, metallic layer is made from zinc or an alloy comprising zinc and aluminum, and the protective, metallic cap is made from aluminum.

The improved method comprises the steps of providing a carbon steel wire pre-coated with a protective, metallic layer having corrosion-resistant properties, the protective, metallic layer being discontinuous at a region on a leading end of the pre-coated wire, disposing the protective, metallic cap near the leading end of the pre-coated wire, adhering the protective, metallic cap to the wire at the region where the protective, metallic layer is discontinuous, and forming a fastener from the pre-coated wire in such a manner that the fastener is formed with a shank and with a head. When the fastener is formed, the head is formed by deformation of the leading end and includes the region where the protective, metallic layer is discontinuous.

Thus, the protective, metallic cap provides the fastener with corrosion resistance at the region of the head where the protective, metallic layer is discontinuous. The protective, metallic layer of course provides the remaining regions of the fastener with corrosion resistance.

Preferably, the adhering step is performed by impact welding simultaneously with the deformation of the leading end so as to form the head. Preferably, the protective, metallic cap is severed from a wire, which is deformed when welded.

Moreover, this invention provides an improved fastener, which can be advantageously manufactured by the improved method summarized above.

BRIEF DESCRIPTION OF THE DRAWINGS

The foregoing and other objects, features, and advantages of this invention will be evident from the following description of a preferred mode for carrying out this invention, with reference to the accompanying drawings, in which like reference characters designate like or corresponding parts throughout the several views, and wherein:

In FIGS. 4 and 5, it is noted that the thickness of the coating layer is exaggerated for illustrative purposes.

DETAILED DESCRIPTION OF PREFERRED MODE

Figure 1:
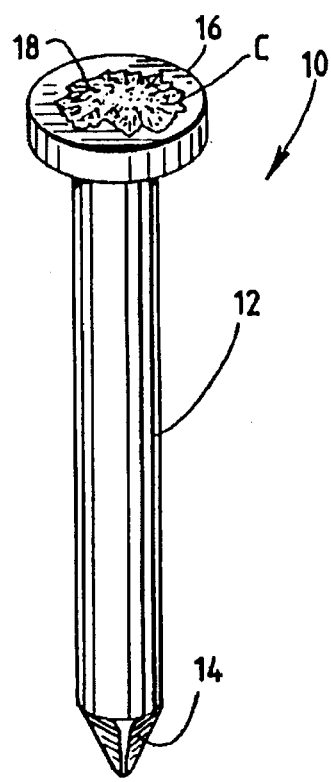
FIG. 1 is a perspective view of a nail for exterior applications, as manufactured by the improved method of the present invention.
Figure 2:
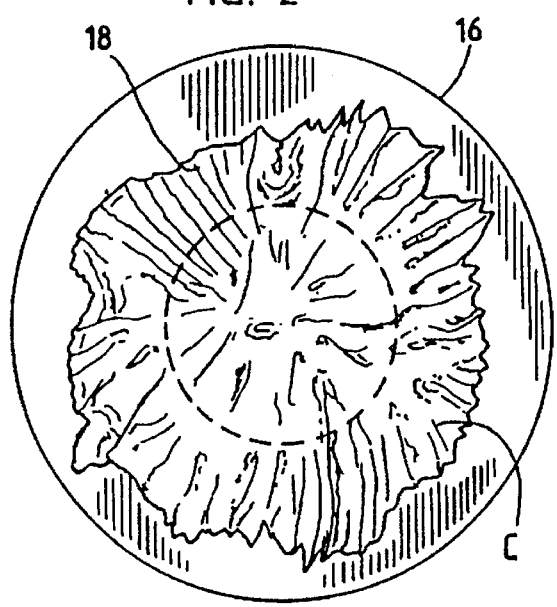
FIG. 2, on a greatly enlarged scale, is a top plan view of the head of the nail shown in FIG. 1.
Figure 4:
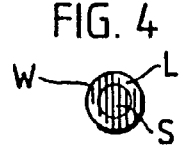
FIG. 4 is an elevational view taken along line 4—4 of FIG. 3, in the direction indicated by the arrows.
Figure 5:
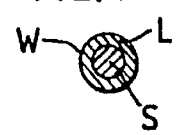
FIG. 5 is a sectional view taken along line 5—5 of FIG. 3, in the direction indicated by the arrows.
Figure 3:
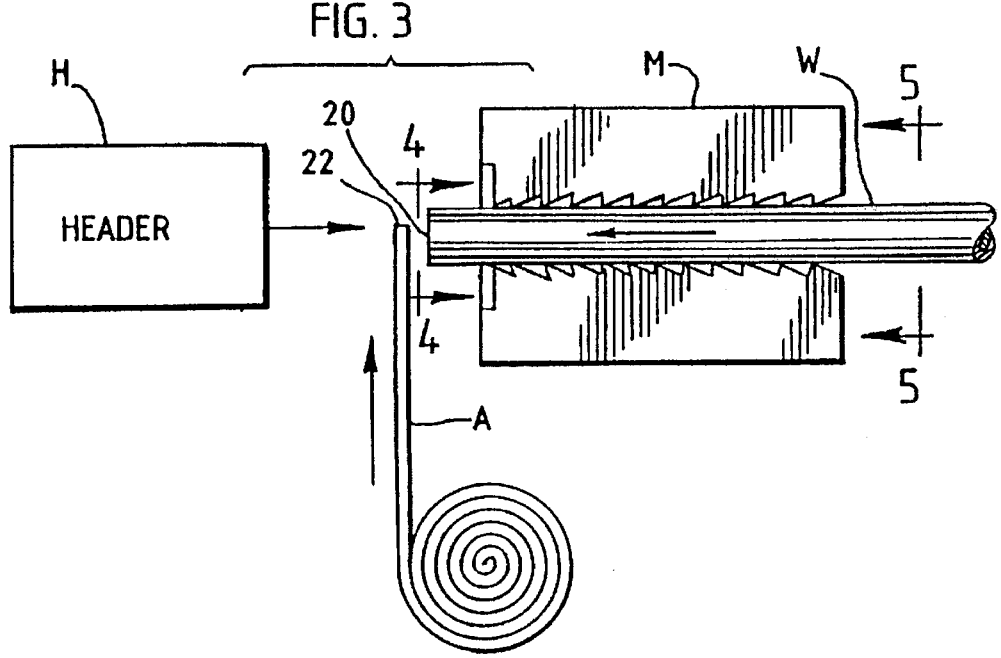
FIG. 3 is a schematic view illustrating the preferred mode for carrying out the improved method of the present invention.

As shown in FIGS. 1 and 2, and as manufactured by the improved method, a nail 10 for exterior applications has a shank 12 formed with a pointed end 14 and a head 16 formed on the opposite end of the shank 12. As shown in FIGS. 3, 4, and 5, the nail 10 is made from carbon steel wire W pre-coated with a protective, metallic layer L having corrosion-resistant properties.

As manufactured, the nail 10 remains coated with the protective, metallic layer L along the shank 12, except possibly at the pointed end 14 where the protective, metallic layer L is discontinuous, and on all surfaces of the head 16, except at a region 18 on the head 16 where the protective, metallic layer L is discontinuous. However, at least part of a protective, metallic cap C having corrosion-resistant properties is welded to the head 16 so as to cover the region 18 on the head 16 where the protective, metallic layer L is discontinuous.

The protective, metallic layer L provides the nail 10 with corrosion resistance along the shank 12, except possible at the pointed end 14 where the protective, metallic layer L is discontinuous, and on the head 16, except at the region 18 on the head 16 where the protective, metallic layer L is discontinuous. The protective, metallic cap C, which has corrosion-resistant properties, provides the nail 10 with corrosion resistance at the region 18 on the head 16 where the protective, metallic layer L is discontinuous.

Desirably, the protective, metallic layer L is made from chromium, nickel, zinc, aluminum, or an alloy comprising zinc and aluminum. Preferably, the protective, metallic layer n is made from zinc or an alloy comprising zinc and aluminum. Galfan™ alloy comprised of approximately 95% zinc by weight, approximately 5% aluminum by weight, and trace amounts of rare earths, manufactured by or pursuant to specifications of the International Lead Zinc Research Organization of New York, N.Y., and available commercially from Indiana Steel and Wire Corporation of Muncie, Ind., is a most preferred alloy for the protective, metallic layer L.

Desirably, the protective, metallic cap C is made from chromium, nickel, zinc, aluminum, or an alloy comprising zinc and aluminum. Preferably, the protective, metallic cap C is made from aluminum. As shown, the protective, metallic cap C is severed from an auxiliary wire A, although an auxiliary foil (not shown) may be used instead.

As shown schematically in FIG. 3, the nail 10 can be advantageously manufactured in a conventional nail-forming machine, such as a Wafios™ nail-forming machine, Model No. N5 or Model No. N6, which has been suitably adapted. The machine includes a mechanism M for gripping the pre-coated wire W, which is fed incrementally by another mechanism (not shown) of the machine, and a header H for forming the head 16 of the nail 10 on a leading end 20 of the wire w. Also, the machine has been adapted to feed the auxiliary wire A.

In the nail-forming machine, the pre-coated wire W is fed incrementally by the mechanism until the leading end 20 of the wire W is extended for a suitable distance. As shown in FIG. 4, the carbon steel S of the wire W is exposed at the leading end 20 of the wire. Also, the auxiliary wire A is fed incrementally until a leading end 22 of the auxiliary wire A is disposed near the leading end 20 of the pre-coated wire W, between the header H and the leading end 20 of the pre-coated wire W. Next, the header H is moved toward the leading end 20 of the pre-coated wire W in such manner that an end part of the auxiliary wire A is welded to the leading end 20 of the pre-coated wire W by impact welding, which deforms the welded part and which severs the welded part from the auxiliary wire A remaining in the nail-forming machine, whereby the welded part provides the protective, metallic cap C, which covers at least the region 18 where the protective, metallic layer L is discontinuous.

Furthermore, the leading end 20 of the pre-coated wire W is deformed simultaneously and in a known manner to form the head 16 of the nail 10. The protective, metallic cap C may cover more of the head 16, beyond the region 18 where the protective, metallic layer L is discontinuous. In further steps outside the scope of this invention, the nail-forming machine forms the pointed end 14 on the nail 10 and severs the nail 10 from the pre-coated wire W remaining in the nail-forming machine.

If the protective, metallic layer L is made from zinc or an alloy comprising zinc and aluminum, such as Galfan™ alloy discussed above, and if the protective, metallic cap C is made from aluminum, the protective, metallic cap C can be visually differentiated from the protective, metallic layer L for purposes of quality inspection.

Various modifications may be made in the preferred embodiment described above without departing from the scope and spirit of this invention.

It is therefore to be understood that within the scope of the appended claims, the present invention may be practiced otherwise than as specifically described herein.

I claim:

1. A method for manufacturing a corrosion-resistant; headed fastener, comprising the steps of:

providing a carbon steel wire pre-coated with a protective, metallic layer having corrosion-resistant properties wherein said protective, metallic layer is not present and is therefore discontinuous at a region defined upon a leading end portion of said pre-coated wire;

disposing a protective, metallic cap, having corrosion-resistant properties, near said leading end portion of said pre-coated wire; and securing said protective, metallic cap upon said leading end portion of said pre-coated wire, so as to cover said region of said leading end portion of said pre-coated wire at which said protective, metallic layer is discontinuous, while de-forming said leading end portion of said pre-coated wire, so as to form a fastener from said pre-coated wire which has a shank portion, and a head portion comprising said region at which said protective, metallic layer is not present, such that said protective, metallic cap provides corrosion resistance to said region of said head portion of said fastener at which said protective, metallic layer is discontinuous while said protective, metallic layer provides corrosion resistance to said shank portion of said fastener.

2. The method of claim 1, wherein:

the securing step comprises welding said protective, metallic cap to said leading end portion of said pre-coated wire.

3. The method of claim 2, wherein:

said welding step is performed by impact welding simultaneously with said deformation of said leading end portion of said pre-coated wire so as to form said head portion of said fastener.

4. The method of claim 1, wherein:

said protective, metallic layer comprises a material selected from the group of chromium, nickel, zinc, aluminum, or an alloy comprising zinc and aluminum.

5. The method as set forth in claim 4, wherein:

said protective, metallic cap is fabricated from a material which is selected from the group of chromium, nickel, zinc, aluminum, or an alloy comprising zinc and aluminum.

6. The method as set forth in claim 5, wherein:

said protective, metallic layer comprises an alloy comprising zinc and aluminum; and said protective, metallic cap comprises aluminum.

7. The method as set forth in claim 6, wherein:

said alloy comprises approximately 95% zinc by weight and approximately 5% aluminum by weight.

8. The method of claim 1, wherein:

said protective, metallic layer comprises a material selected from the group of zinc or an alloy comprising zinc and aluminum.

9. The method of claim 1, wherein:

said protective, metallic cap is severed from a wire during said securing of said protective, metallic cap to said leading end portion of said pre-coated wire from which said fastener is formed.

10. A method for manufacturing a corrosion-resistant, headed fastener, comprising the steps of:

providing a carbon steel wire pre-coated with a protective, metallic layer having corrosion-resistant properties wherein said protective, metallic layer is not present and is therefore discontinuous at a region defined upon a leading end portion of said pre-coated wire;

disposing a protective, metallic cap, having corrosion-resistant properties, near said leading end portion of said pre-coated wire; and simultaneously securing said protective, metallic cap upon said leading end portion of said pre-coated wire, so as to cover said region of said leading end portion of said pre-coated wire at which said protective, metallic layer is discontinuous, and deforming said leading end portion of said pre-coated wire so as to form a fastener from said pre-coated wire which has a shank portion, and a head portion which includes said region at which said protective, metallic layer is discontinuous, such that said protective, metallic cap provides corrosion resistance to said region of said head portion of said fastener at which said protective, metallic layer is discontinuous while said protective, metallic layer provides corrosion resistance to said shank portion of said fastener.

11. The method of claim 10, wherein:

said protective, metallic layer comprises a material which is selected from the group of chromium, nickel, zinc, aluminum, or an alloy comprising zinc and aluminum.

12. The method as set forth in claim 11, wherein:

said protective, metallic cap is fabricated from a material which is selected from the group of chromium, nickel, zinc, aluminum, or an alloy comprising zinc and aluminum.

13. The method as set forth in claim 12, wherein:

said protective, metallic layer comprises an alloy comprisingzinc and aluminum; and said protective, metallic cap comprises aluminum.

14. The method as set forth in claim 13, wherein:

said alloy comprises approximately 95% zinc by weight and approximately 5% aluminum by weight.

15. The method of claim 10, wherein:

said protective, metallic cap is severed from a wire during said securing of said protective, metallic cap to said leading end portion of said pre-coated wire from which said fastener is formed.

16. The method of claim 10, wherein:

said protective, metallic layer comprises a material which is selected from the group of zinc or an alloy comprising zinc and aluminum.

17. The method as set forth in claim 10, wherein:

said securing step comprises welding said protective, metallic cap to said leading end portion of said pre-coated wire.

18. The method as set forth in claim 17, wherein:

said welding step is performed by impact welding simultaneously with said deformation of said leading end portion of said pre-coated wire so as to form said head portion of said fastener.

19. A method of manufacturing a corrosion-resistant headed fastener, comprising the steps of:

providing a carbon steel wire pre-coated with a protective, metallic layer having corrosion-resistant properties wherein said protective, metallic layer is not present and is therefore discontinuous at a region defined upon a leading end portion of said pre-coated wire;

disposing a metallic material, having corrosion-resistant properties, near said leading end portion of said pre-coated wire; and simultaneously severing a portion of said metallic material from a remaining portion of said metallic material, securing said severed portion of said metallic material upon said leading end portion of said pre-coated wire so as to cover said region of said leading end portion of said pre-coated wire at which said protective, metallic layer is discontinuous, and deforming said leading end portion of said pre-coated wire so as to form a fastener from said pre-coated wire which has a shank portion, and a head portion which includes said region at which said protective, metallic layer is discontinuous, such that said severed, secured portion of said metallic material serves as a protective cap which provides corrosion resistance to said region of said head portion of said fastener at which said protective, metallic layer is discontinuous while said protective, metallic layer provides corrosion resistance to said shank portion of said fastener.

20. A method as set forth in claim 19, wherein:

said securing of said severed portion of said metallic material comprises impact welding.

21. A method as set forth in claim 19, wherein:

said protective metallic layer, and said protective metallic material, each comprises a material which is selected from the group of chromium, nickel, zinc, aluminum, or an alloy comprising zinc and aluminum.

22. A method as set forth in claim 21, wherein:

said protective, metallic layer comprises an alloy comprising zinc and aluminum; and said protective, metallic material comprises aluminum.

* * * * *